United States Patent
Doushita et al.

(10) Patent No.: US 9,672,955 B2
(45) Date of Patent: Jun. 6, 2017

(54) CLAMP AND WIRE HARNESS HAVING CLAMP

(71) Applicant: Yazaki Corporation, Tokyo (JP)

(72) Inventors: Kenichi Doushita, Makinohara (JP); Kunihiko Sato, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/802,287

(22) Filed: Jul. 17, 2015

(65) Prior Publication Data

US 2016/0020000 A1     Jan. 21, 2016

(30) Foreign Application Priority Data

Jul. 18, 2014    (JP) ................ 2014-148018

(51) Int. Cl.
| | |
|---|---|
| *H01B 7/00* | (2006.01) |
| *F16B 2/22* | (2006.01) |
| *F16L 3/12* | (2006.01) |
| *F16B 21/08* | (2006.01) |
| *H02G 3/32* | (2006.01) |
| *B60R 16/02* | (2006.01) |

(52) U.S. Cl.
CPC ....... *H01B 7/0045* (2013.01); *B60R 16/0215* (2013.01); *F16B 2/22* (2013.01); *F16B 21/086* (2013.01); *F16L 3/1222* (2013.01); *H02G 3/32* (2013.01)

(58) Field of Classification Search
CPC .......................... B60R 16/0216; H01B 7/0045
USPC ......................................................... 174/72 A
See application file for complete search history.

(56) References Cited

U.S. PATENT DOCUMENTS

| | | | | |
|---|---|---|---|---|
| 4,358,081 A * | 11/1982 | Notoya | .................... | F16L 3/233 24/16 PB |
| 6,669,149 B2 * | 12/2003 | Akizuki | .................. | H02G 3/26 248/222.12 |
| 8,403,272 B2 * | 3/2013 | Ohno | ...................... | F16L 3/127 174/164 |

(Continued)

FOREIGN PATENT DOCUMENTS

| | | |
|---|---|---|
| CN | 103165994 A | 6/2013 |
| CN | 103733456 A | 4/2014 |

(Continued)

OTHER PUBLICATIONS

Office Action dated Jan. 25, 2017 issued by the State Intellectual Property Office of P.R. China in counterpart Chinese Patent Application No. 201510424433.4.

*Primary Examiner* — Hoa C Nguyen
*Assistant Examiner* — Stanley Tso
(74) *Attorney, Agent, or Firm* — Sughrue Mion, PLLC

(57) ABSTRACT

A clamp includes a base plate that is locked to an adhesive sheet which covers and holds an electric wire, a shaft that projects from the base plate and is inserted through an attaching hole which is bored through the adhesive sheet, an engaging portion that is formed at the distal end of the shaft, is inserted through the attaching hole and is engaged with an engaging hole of an attached body, and fixing pieces that project from the base plate to have an interval between projecting ends of the fixing pieces which is larger than the maximum opening width of the attaching hole, and hold and fix the fringe of the attaching hole with the base plate.

3 Claims, 6 Drawing Sheets

(56) References Cited

U.S. PATENT DOCUMENTS

| | | | |
|---|---|---|---|
| 8,844,883 B2* | 9/2014 | Tsutsumi | H02G 3/32 248/71 |
| 8,870,131 B2* | 10/2014 | Gotou | F16B 21/086 174/480 |
| 8,957,311 B2 | 2/2015 | Shimada | |
| 9,484,723 B2 | 11/2016 | Doshita | |
| 2004/0238204 A1 | 12/2004 | Ono | |
| 2007/0257159 A1* | 11/2007 | Nelson | F16B 21/02 248/73 |
| 2008/0035801 A1* | 2/2008 | Adams | F16B 5/0685 248/73 |
| 2010/0294896 A1* | 11/2010 | Sayilgan | B64C 1/406 248/73 |
| 2013/0146353 A1 | 6/2013 | Shimada | |
| 2014/0151116 A1 | 6/2014 | Doshita | |

FOREIGN PATENT DOCUMENTS

| | | | |
|---|---|---|---|
| CN | 103782462 A | | 5/2014 |
| JP | 2007/259604 | * | 10/2007 |
| JP | 2013-021863 A | | 1/2013 |

* cited by examiner

CLAMP AND WIRE HARNESS HAVING CLAMP

CROSS REFERENCE TO RELATED APPLICATION

This application is based on Japanese Patent Applications No. 2014-148018 filed on Jul. 18, 2014, the contents of which are incorporated herein by reference.

BACKGROUND OF THE INVENTION

1. Technical Field

The present invention relates to a clamp and a wire harness having the clamp.

2. Background Art

A clip which is attached to an adhesive sheet which covers and holds an electric wire which is wired in a predetermined wiring manner to an attached body such as a body panel or a door panel of a vehicle, to attach the adhesive sheet to the attached body and a wire harness having the clip are proposed (refer to a patent document 1). As shown in FIG. 6, a clip (clamp) 502 of this kind includes a body 507, insertion portions 518 which are raised from the body 507 and inserted into an attaching hole 535 which is bored in an adhesive sheet 531 which is provided with adhesive material on at least one surface and holds an electric wire when the surface is bonded to itself, and an engaging portion 508 which is inserted through the attaching hole 535, engages with the insertion portion 518, and engages in an engaging hole which is bored in a panel.

The body 507 includes an elliptical portion 510 which is formed into a flat, elliptical shape, a pair of locking portions 512 which extend respectively from two longitudinal ends of the elliptical portion 510 and are locked to the fringe of the attaching hole 535 of the adhesive sheet 531, and a pair of insertion portions 518 which are raised respectively from two lateral ends of the elliptical portion 510 and are inserted into the attaching hole 535.

When the engaging portion 508 is engaged into the engaging hole of the panel, the pair of locking portions 512 are locked to the fringe of the attaching hole of the adhesive sheet. The pair of insertion portions 518 include engaging claws 528 which are provided on two opposite surfaces, and locking claws 523 which are provided at the upper end portions.

The engaging portion 508 includes engaging projections 520 which are inserted and engaged into the pair of insertion portions 518, a semi-spherical portion 522 which is provided at the base ends of the engaging projections 520, and a pair of engaging pieces 524 which extend from the semi-spherical portion 522 toward the engaging projections 520 and engage with the engaging hole of the panel. When the engaging projections 520 are engaged with the insertion portions 518, the locking claws 523 of the insertion portions 518 are disposed between a plurality of locking claws 521 which are provided along the longitudinal direction of the semi-spherical portion 522.

The above described clip 502 can hold the adhesive sheet 531 between the body 507 and the engaging portion 508. Therefore, the adhesive sheet 531 which holds the electric wire can be fixed to the panel by being held with the clip 502. Therefore, a wire harness tape which is wound around the electric wire and the clip or the like is abolished, and the expense can be reduced.

However, because the above described clip 502 is divided into two components, or the body 507 and the engaging portion 508, the component cost is increased. Further, in an operation of assembling the wire harness, in addition to a step of inserting the insertion portions 518 of the body 507 into the attaching hole 535 of the adhesive sheet 531, a step of engaging the engaging projections 520 of the engaging portion 508 with the insertion portions 518 of the body 507 becomes necessary. Thus, the production efficiency might be decreased and the production cost might be increased.

The present invention is made in view of the above situation, and the object of the present invention is to provide a clamp which can be easily attached to an adhesive sheet that holds a wire harness and a wire harness including the clamp without increasing the number of components.

SUMMARY OF THE INVENTION

The above object of the present invention is accomplished by the following constitutions.

(1) According to an aspect of the invention, a clamp includes a base plate that is locked to an adhesive sheet which covers and holds an electric wire, a shaft that projects from the base plate and is inserted through an attaching hole which is bored through the adhesive sheet, an engaging portion that is formed at the distal end of the shaft, is inserted through the attaching hole and is engaged with an engaging hole of an attached body, and fixing pieces that project from the base plate to have an interval between projecting ends of the fixing pieces which is larger than the maximum opening width of the attaching hole, and hold and fix the fringe of the attaching hole with the base plate.

According to the clamp of the constitution of the above (1), when the fixing pieces following the engaging portion is inserted into the attaching hole of the adhesive sheet, the fringe of the attaching hole which contacts the fixing pieces that have the interval between the projecting ends which is wider than the maximum opening width of the attaching hole is elastically deformed and stretched. Thus, the attaching hole of the adhesive sheet can pass through the fixing pieces that have the interval between the projecting ends which is wider than the maximum opening width of the attaching hole. The fringe of the attaching hole that elastically deformed when passing the fixing pieces is restored after passing the fixing pieces, and is sandwiched between the base plate and the fixing pieces. That is, when the fringe of the attaching hole becomes sandwiched between the base plate and the fixing pieces, the clamp is fixed and will not fall out from the attaching hole of the adhesive sheet unintentionally. Therefore, the clamp can be easily attached to the adhesive sheet which holds the electric wire without increasing the number of components.

(2) In the clamp according to the above (1), the shaft has a pressing portion, which holds the fringe of the engaging hole with the engaging portion to engage with the fringe from the back side of the insertion direction.

According to the clamp of the constitution of the above (2), the attached body can be sandwiched between the engaging portion, which is inserted through the engaging hole of the attached body to engage with the fringe of the engaging hole from the front side of the insertion direction, and the pressing portion which engages with the fringe from the back side of the insertion direction.

Therefore, the clamp can fix the electric wire to the attached body steadily even if the clamp is subject to vibration or the like.

Furthermore, since the pressing portion is provided with a packing member at the side of the engaging portion, when the engaging portion of the clamp is fixed to the engaging hole of the attached body, the packing member is sandwiched between the attached body and the pressing portion. Thus, the packing member which is sandwiched between the pressing portion of the clamp and the attached body can water-tightly seal the clamp and the attached body by closing contacting them.

(3) In the clamp according to the above (1) or (2), the projecting ends of the fixing pieces are formed into a substantially arc shape.

According to the clamp of the constitution of the above (3), when the fixing pieces are inserted through the attaching hole, which is formed into an elliptical shape, of the adhesive sheet, the projecting ends of the fixing pieces which are formed into a substantially arc shape becomes hard to be caught by the fringe of the attaching hole, and an inserting operation can be performed smoothly.

(4) A wire harness includes an electric wire, an adhesive sheet which covers and holds the electric wire, a clamp whose base plate is locked to the adhesive sheet. The clamp is a clamp according to any one of the above (1) to (3).

According to the wire harness of the constitution of the above (4), since the above described clamp is provided, the holding force of the adhesive sheet and the clamp can be improved without using a wire harness tape or the like.

According to the clamp and the wire harness including the clamp of the present invention, the clamp which can be easily attached to the adhesive sheet that holds the wire harness and the wire harness including the clamp can be provided without increasing the number of components.

The present invention has been briefly described above. Further, details of the invention will become more apparent after embodiments of the invention described below (hereinafter referred to as "embodiments") are read with reference to the accompanying figures.

BRIEF DESCRIPTION OF DRAWINGS

FIG. 4A is a sectional view before the clamp is mounted to the adhesive sheet, FIG. 4B is a sectional view when the clamp is being mounted to the adhesive sheet, and FIG. 4C is a sectional view after the clamp is mounted to the adhesive sheet.

DESCRIPTION OF EMBODIMENTS

Figure 1:
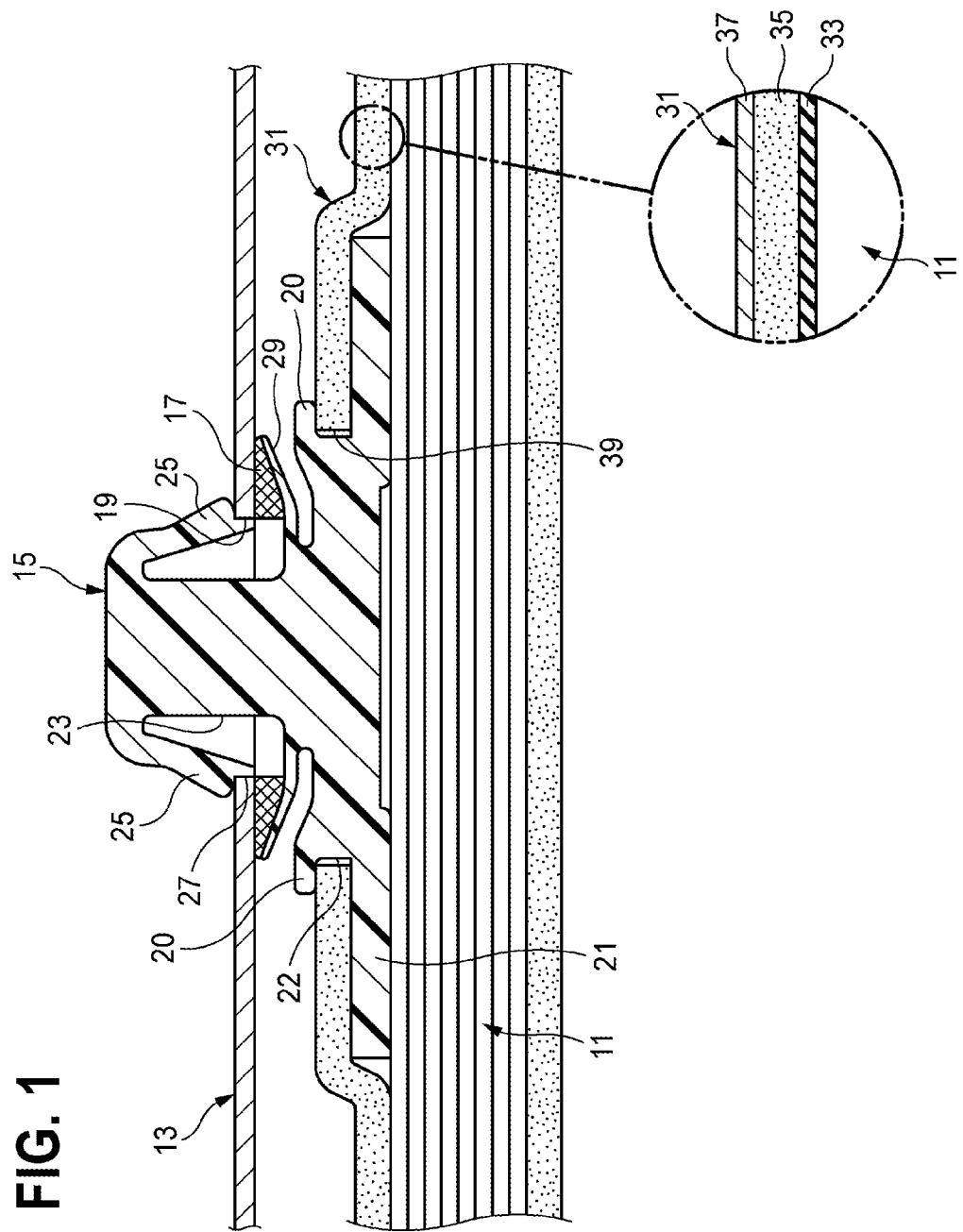
FIG. 1 is a longitudinal sectional view which indicates a clamp and a wire harness including the clamp according to one embodiment of the present invention.

Below, an embodiment of the invention is described with reference to the figures. As shown in FIG. 1, a wire harness 51 according to one embodiment of the present invention includes an electric wire 11, a one-sided self-adhesive sheet 31 which is an adhesive sheet that covers and holds the electric wire 11, and a clamp 15 which has a base plate 21 that is locked to the one-sided self-adhesive sheet 31, as main members.

An attached body 13 may be, for example, a vehicle body panel or a door panel. An engaging hole 19 of a circular or elliptical shape to attach the clamp 15 is bored through the attached body 13.

Figure 2:
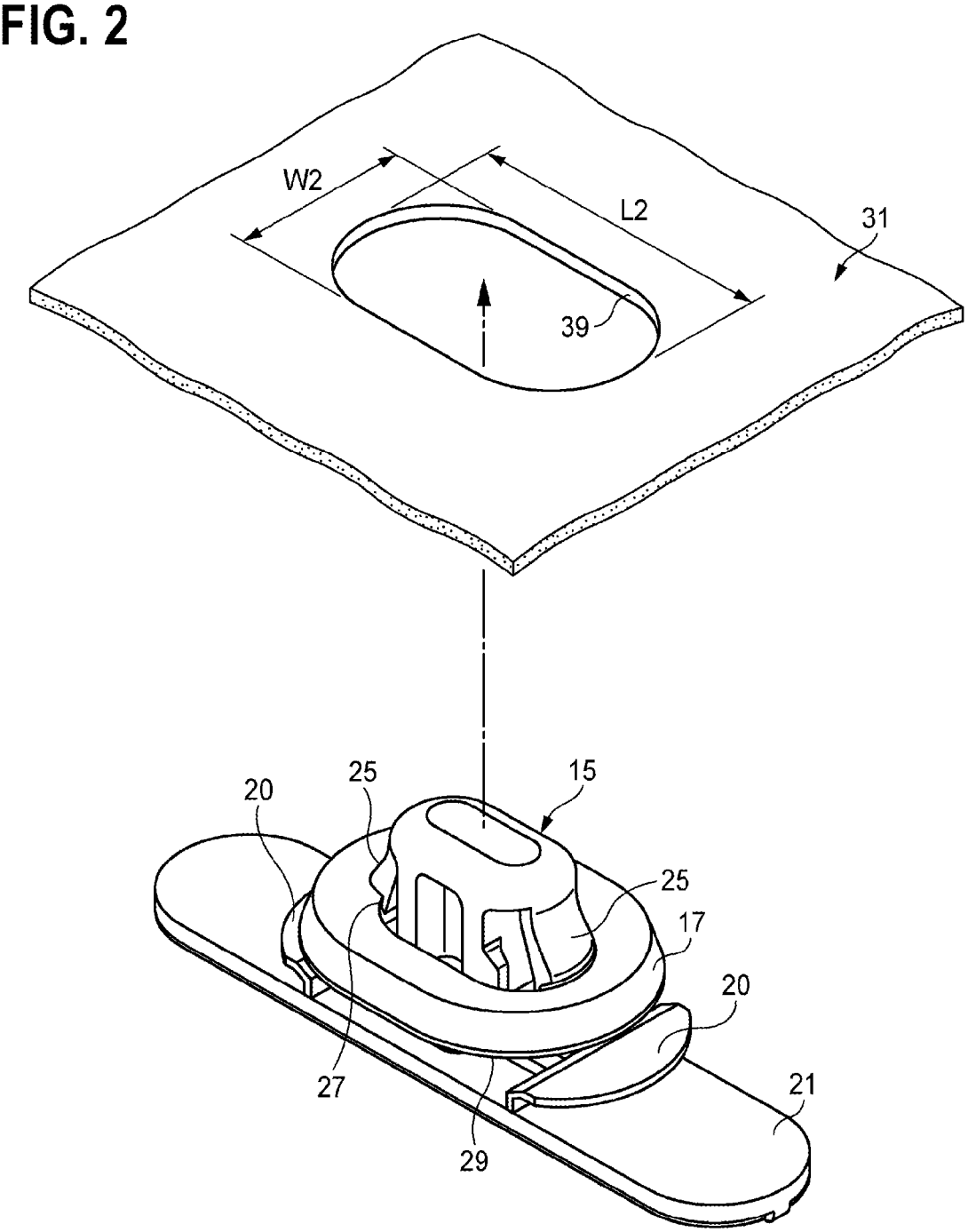
FIG. 2 is an exploded perspective view of main parts of the clamp and an adhesive sheet shown in FIG. 1.
Figure 3A:
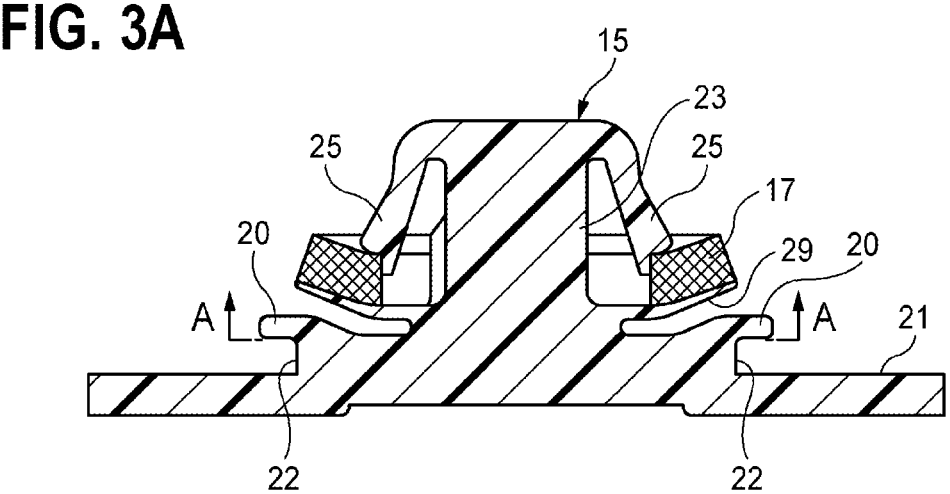
FIG. 3A is a longitudinal sectional view of the clamp shown in FIG. 2.
Figure 3B:
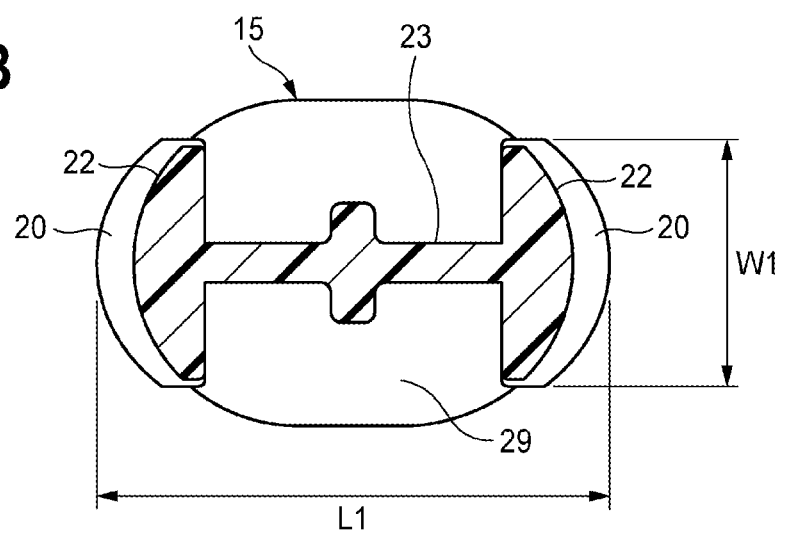
FIG. 3B is an A-A cross-sectional view in FIG. 3A.

The clamp 15 according to the present embodiment includes, as shown in FIGS. 2 and 3, the base plate 21 of an elliptical shape which is locked to the one-sided self-adhesive sheet 31 that covers and holds the electric wire 11, a shaft 23 which projects from the base plate 21 and is inserted through an attaching hole 39 of an elliptical shape that is opened through the one-sided self-adhesive sheet 31, a pair of locking claws (engaging portion) 25, which are formed at the distal end of the shaft 23, inserted through the attaching hole 39, and engaged with the engaging hole 19 of the attached body 13, and a pair of fixing pieces 20 which project from the base plate 21 to have an interval L1 between projecting ends which is wider than a longitudinal width (maximum opening width) L2 of the attaching hole 39, and which sandwich and fix the fringe of the attaching hole 39 with the base plate 21.

The locking portion of the clamp 15 according to the present embodiment is formed by the pair of locking claws 25 that expand toward the base plate 21. The locking claws 25 are elastically deformable in a direction in which expanding ends of the pair of locking claws 25 approach each other. The expanding ends of the pair of locking claws 25 are formed to have an outer diameter that is larger than the inner diameter of the engaging hole 19. When the clamp 15 is inserted through the engaging hole 19, the expanding ends of the pair of locking claws 25 elastically deform to approach each other. When the locking claws 25 pass the engaging hole 19, the locking claws 25 open by an elastic repulsive force, and locking steps 27 which the expanding ends are provided with are locked to the engaging hole 19 so that the clamp 15 is regulated from falling out in a direction opposite to the insertion direction. The locking portion according to the present invention is not limited to the pair of locking claws 25 in this embodiment, but various forms can be adopted as long as the locking portion can be engaged to the engaging hole 19 of the attached body 13.

The pair of fixing pieces 20 of the clamp 15 according to the present embodiment project from the base plate 21 near the distal end of the shaft 23 toward the longitudinal ends of the base plate 21 respectively, and the projecting ends of the pair of fixing pieces 20 are formed into a substantially arc shape. The pair of fixing pieces 20 have the interval L1 between the projecting ends which is wider than the longitudinal width L2 of the attaching hole 39, as described above, and have a width W1 which is equal to or slightly wider than a lateral width W2 of the attaching hole 39. The fixing pieces of the present invention may be three or more fixing pieces that project radially around the base end of the shaft 23.

Further, as shown in FIG. 3A, fixing piece bases 22 between the base plate 21 and the fixing pieces 20 which sandwich the fringe of the attaching hole 39 of the one-sided self-adhesive sheet 31 are formed into a substantially arc shape along the fringe of the attaching hole 39 of the one-sided self-adhesive sheet 31.

The shaft 23 of the clamp 15 according to the present embodiment has a pressing portion 29 which clamps the fringe of the engaging hole 19 of the attached body 13 with the pair of locking claws 25 to engage with the fringe from the back side of the insertion direction (refer to FIG. 1). The pressing portion 29, as shown in FIGS. 2 and 3, is formed into a shallow-dish-like shape which has an ellipse shape that is slightly larger than the attaching hole 39 of the one-sided self-adhesive sheet 31 and greatly larger than the engaging hole 19 of the attached body 13 and opens upward, and has a shape that becomes thin toward the distal end (opening edge).

Furthermore, one side of the pressing portion 29 that is closer to the locking claws 25 is provided with an ellipse ring-like packing member 17, and the packing member 17 is sandwiched between the attached body 13 and the pressing portion 29 when the pair of locking claws 25 of the clamp 15 are fixed to the engaging hole 19 of the attached body 13. While the clamp 15 is attached to the attached body 13, the packing member 17 is compressed and elastically deformed.

When the fringe of the attaching hole 39 becomes sandwiched between the base plate 21 and the fixing pieces 20, the clamp 15 is fixed and will not fall out from the attaching hole 39 of the one-sided self-adhesive sheet 31 unintentionally.

The one-sided self-adhesive sheet 31 according to the present embodiment covers and is adhere to the base plate 21 of the clamp 15 and the electric wire 11. A plurality of the attaching holes 39 into which the shaft 23 of the clamp 15 whose distal end is formed with the pair of locking claws 25 is inserted are bored through the one-sided self-adhesive sheet 31. The one-sided self-adhesive sheet 31 used in the present embodiment, as shown in FIG. 1 with an enlarged section, is a self-adhesive sheet which can be bonded to itself only by combining two parts of its own adhesive surface (inside surface). That is, the self-adhesive sheet may be easily bonded by simply combining two parts of the adhesive surface (inside surface) without paste or a binding tape. Further, a special adhesive layer (adhering layer) 33 of the one-sided self-adhesive sheet 31 will not stick to the electric wires 11 or the fingers of an operator, and thus the assembling operativity will not be decreased. In the one-sided self-adhesive sheet 31, a surface material 37 is laminated on the outside surface of a sheet base material 35 made of PP (polypropylene) foams, and a special adhesive layer 33 is laminated on the inside surface. The one-sided self-adhesive sheet 31 has such an elasticity that the one-sided self-adhesive sheet 31 can be stretched when an external force is applied. Craft paper, a liner board, a PET (polyethylene terephthalate) film, a PP film, a nonwoven fabric or the like may be used for the surface material 37. The one-sided self-adhesive sheet 31 has properties which are that the tensile strength in the longitudinal direction is 49 N/cm width, and the tensile strength in the transverse direction is 23 N/cm width, (conforming to JISK-6767), the tear strength in the longitudinal direction is 7.8 N, and the tear strength in the transverse direction is 6.8 N (conforming to JISK-6767), the water vapor permeability is 0.0052 g/cm2·24 hrs (FS-101B), and the initial adhesion is 2.5 N/cm width (T type peel test). For example, Cro-nel (registered trademark) made by American blackwell company can be used as the one-sided self-adhesive sheets 31. The adhesive sheet of the present invention is not limited to the above one-sided self-adhesive sheet 31, but various adhesive sheet such as well-known adhesive sheets in which adhesive is coated on at least part of or all of one surface of the sheet base material 35 can be used.

The one-sided self-adhesive sheet 31 holds and covers the electric wire 11. The one-sided self-adhesive sheet 31 is formed into, for example, one piece of rectangular shape along the straight line part of the electric wire 11, and has a pair of edges along the electric wire 11. Before the one-sided self-adhesive sheet 31 holds and covers the electric wire 11, the special adhesive layer 33 is on the top, and the electric wire 11 is put on the top half of the one-sided self-adhesive sheet 31 of the rectangular shape. When the electric wire 11 is put on the top half of the one-sided self-adhesive sheet 31, the bottom half of the one-sided self-adhesive sheet 31 is folded upward along the electric wire 11 with a folding line at the central portion as the border, so that the special adhesive layer 33 adheres to itself. That is, the one-sided self-adhesive sheet 31 that holds and covers the electric wire 11 becomes half-sized in the top and bottom direction compared with the expanded rectangular shape. Of course, it is also possible that two pieces of the one-sided self-adhesive sheets 31 are adhered to each other to hold the electric wire 11.

Then, an operation of the clamp 15 having the above constitution and the wire harness 51 that includes the clamp 15 is described.

Figure 4A:
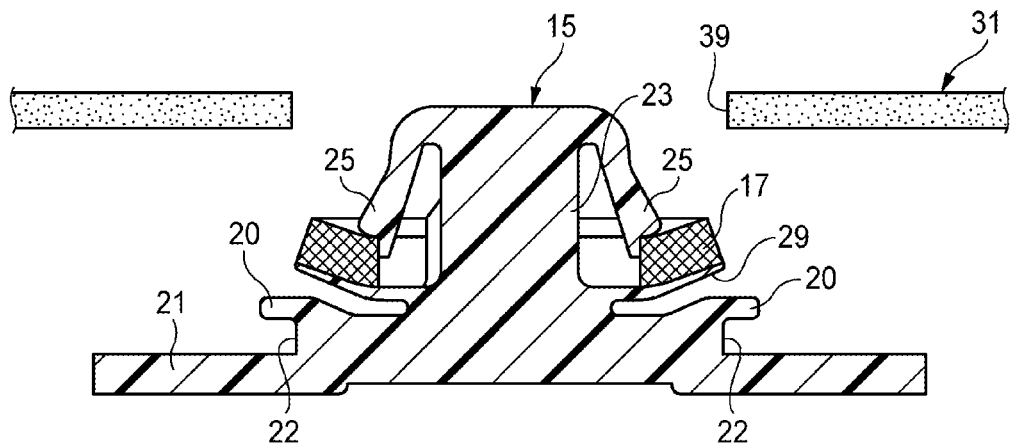
FIGS. 4A-4C are illustrative figures to describe a procedure of attaching the clamp shown in FIG. 2 to an attaching hole of the adhesive sheet.

First, when the clamp 15 according to the present embodiment is attached to the attaching hole 39 of the one-sided self-adhesive sheet 31, as shown in FIG. 4A, the one-sided self-adhesive sheet 31 is placed so that the attaching hole 39 is above the shaft 23 of the clamp 15 whose distal end is formed with the pair of locking claws 25, and the one-sided self-adhesive sheet 31 is just moved downward. Then, the fringe of the attaching hole 39 which contacts the pressing portion 29 is elastically deformed and stretched to pass through the pressing portion 29.

Figure 4B:
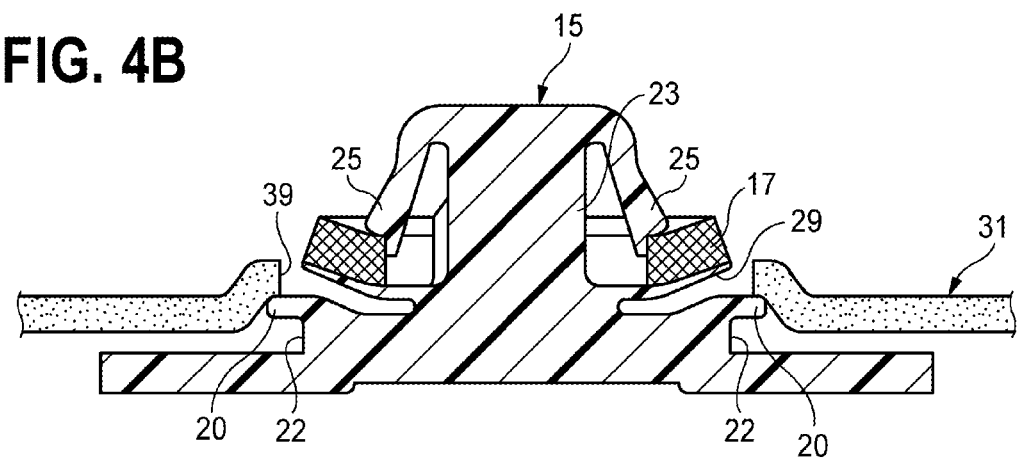

Then, as shown in FIG. 4B, when the one-sided self-adhesive sheet 31 is further moved downward, the fringe of the attaching hole 39 which contacts the pair of fixing pieces 20 that have the interval L between the projecting ends which is wider than the longitudinal width L2 of the attaching hole 39 is elastically deformed and stretched. Thus, the attaching hole 39 of the one-sided self-adhesive sheet 31 can pass through the pair of fixing pieces 20 that have the interval L between the projecting ends which is wider than the longitudinal width L2 of the attaching hole 39.

Figure 4C:
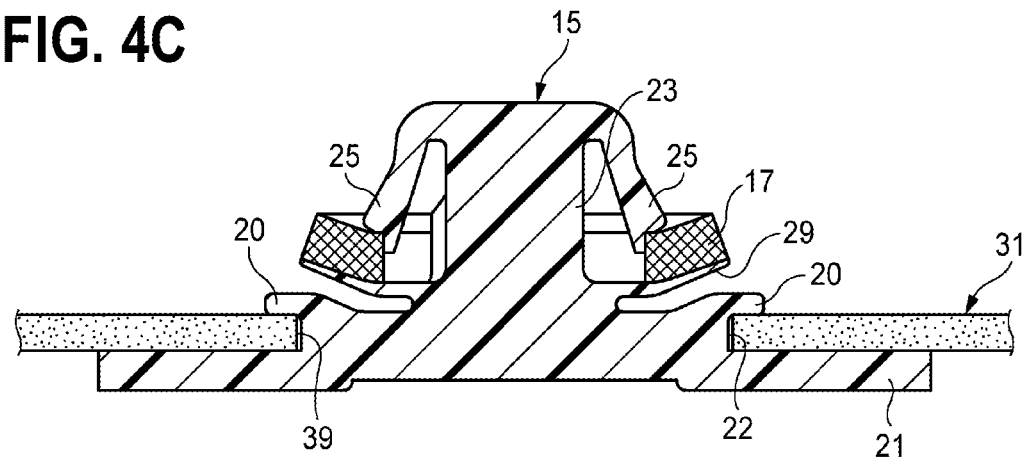

The fringe of the attaching hole 39 that elastically deformed when passing the pair of fixing pieces 20 is restored after the pair of fixing pieces 20 is passed, and as shown in FIG. 4C, while the fringe of the attaching hole 39 is sandwiched between the base plate 21 and the fixing pieces 20, the inner surface of the attaching hole 39 contacts the fixing piece bases 22 between the base plate 21 and the fixing piece bases 22. When the fringe of the attaching hole 39 becomes sandwiched between the base plate 21 and the pair of fixing pieces 20, the clamp 15 is fixed and will not fall out from the attaching hole 39 of the one-sided self-adhesive sheet 31 unintentionally.

That is, because the one-sided self-adhesive sheet 31 which can be bonded to itself only by combining its own adhesive surfaces cannot fix a clamp to the attaching hole 39 of the one-sided self-adhesive sheet 31 only by inserting the pair of locking claws 25 in the clamp which does not include the pair of fixing pieces 20 through the attaching hole 39 because the one-sided self-adhesive sheet 31 cannot be adhered to the base plate 21. In contrast, the clamp 15 according to the present embodiment will not fall out from the attaching hole 39 of the one-sided self-adhesive sheet 31 unintentionally, since the fringe of the attaching hole 39 is fixed by being sandwiched between the base plate 21 and the pair of fixing pieces 20. Of course, the clamp 15 according to the present embodiment is effective for not only the one-sided self-adhesive sheet 31, but also well-known adhesive sheets in which adhesive is coated onto part of one surface of the sheet base material but is not coated onto those part corresponding to the base plate 21.

Therefore, according to the clamp 15 and the wire harness 51 including the clamp 15 according to the present embodiment, the clamp 15 can be easily attached to the one-sided self-adhesive sheet 31 which holds the electric wire 11 without increasing the number of components.

According to the clamp 15 of the present embodiment, the shaft 23 has the pressing portion 29 which clamps the fringe of the engaging hole 19 with the pair of locking claws 25 to engage with the fringe from the back side of the insertion direction. Thus, the attached body 13 can be sandwiched between the pair of locking claws 25, which are inserted through the engaging hole 19 of the attached body 13 to engage with the fringe of the engaging hole 19 from the front side of the insertion direction, and the pressing portion 29 which engages with the fringe from the back side of the insertion direction. Therefore, the clamp 15 can fix the electric wire 11 to the attached body 13 steadily even if the clamp 15 is subject to vibration or the like.

Furthermore, since the pressing portion 29 is provided with the packing member 17 at the side of the pair of locking claws 25, when the pair of locking claws 25 of the clamp 15 are fixed to the engaging hole 19 of the attached body 13, the packing member 17 is sandwiched between the attached body 13 and the pressing portion 29. Thus, the packing member 17 which is sandwiched between the pressing portion 29 of the clamp 15 and the attached body 13 can water-tightly seal the clamp 15 and the attached body 13 by closing contacting them.

According to the clamp 15 of the present embodiment, the projecting ends of the pair of fixing pieces 20 are formed into a substantially arc shape. Thus, when the pair of fixing pieces 20 are inserted through the attaching hole 39, which is formed into an elliptical shape, of the one-sided self-adhesive sheet 31, the projecting ends of the fixing pieces 20 which are formed into a substantially arc shape becomes hard to be caught by the fringe of the attaching hole 39, and an inserting operation can be performed smoothly.

Figure 5A:
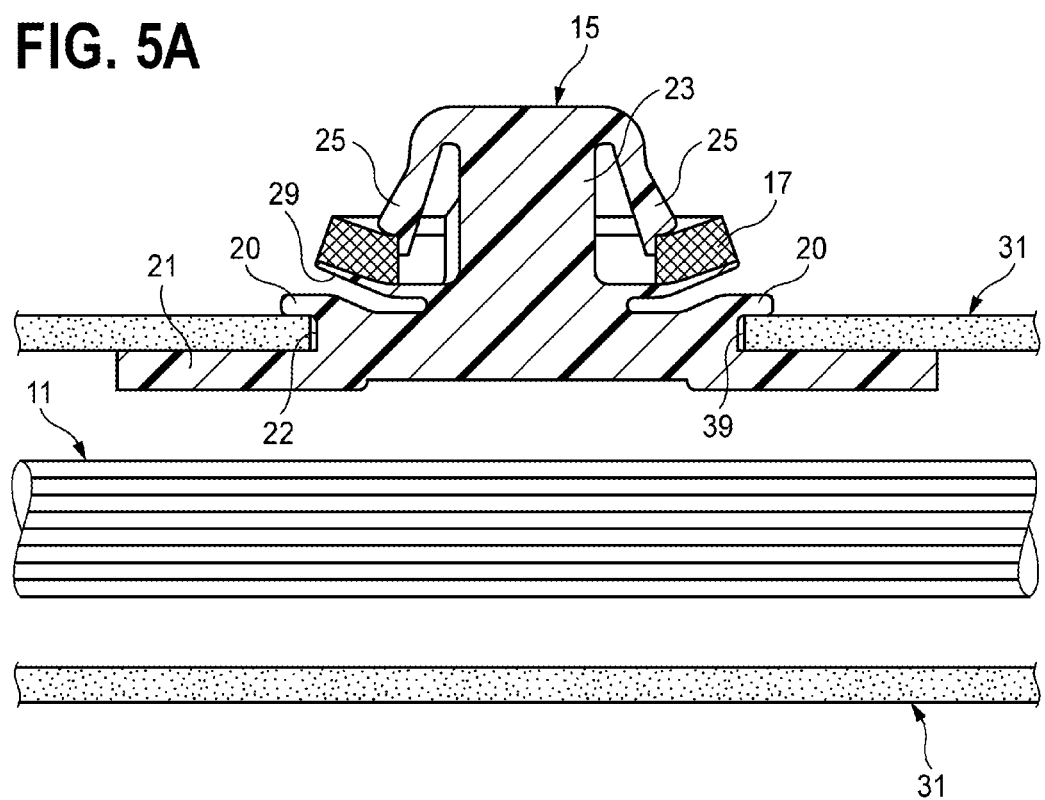
FIG. 5A is a longitudinal sectional view of the wire harness before the adhesive sheet to which the clamp is mounted covers the electric wire.

As shown in FIG. 5A, after a plurality of the clamps 15 are attached to the attaching holes 39 of the one-sided self-adhesive sheet 31 at predetermined intervals, the one-sided self-adhesive sheet 31 is folded along the electric wire 11 with a folding line at the central portion as the border and covers the electric wire 11. When the fringe of the attaching hole 39 becomes sandwiched between the base plate 21 and the pair of fixing pieces 20, the clamp 15 will not fall out from the attaching hole 39 of the one-sided self-adhesive sheet 31 unintentionally, and the operation of covering the electric wire 11 with the one-sided self-adhesive sheet 31 becomes easy.

Figure 5B:
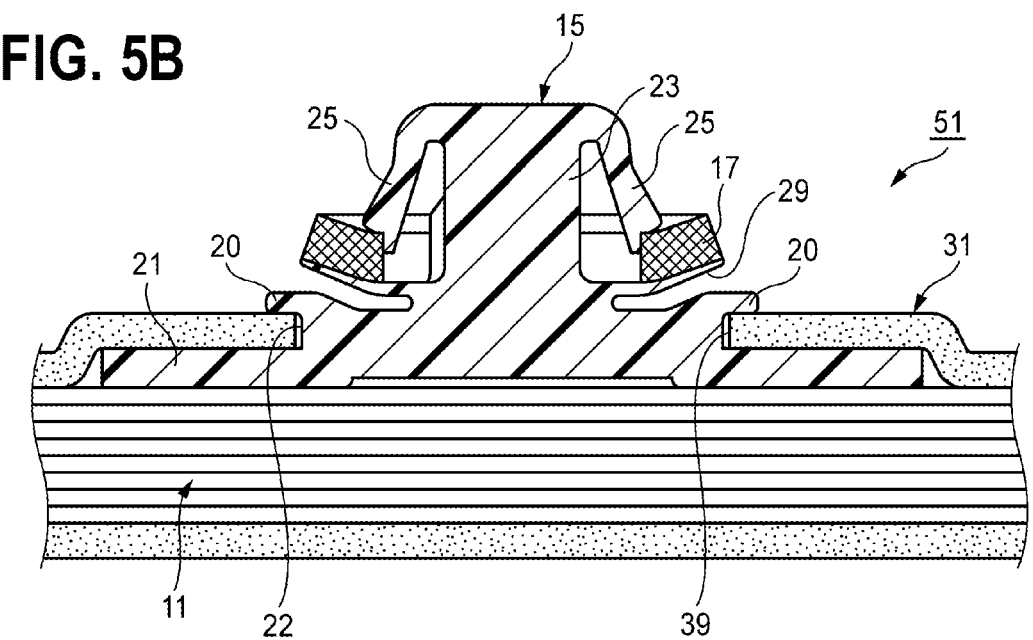
FIG. 5B is a longitudinal sectional view of the wire harness in which the adhesive sheet covers the electric wire.
Figure 6:
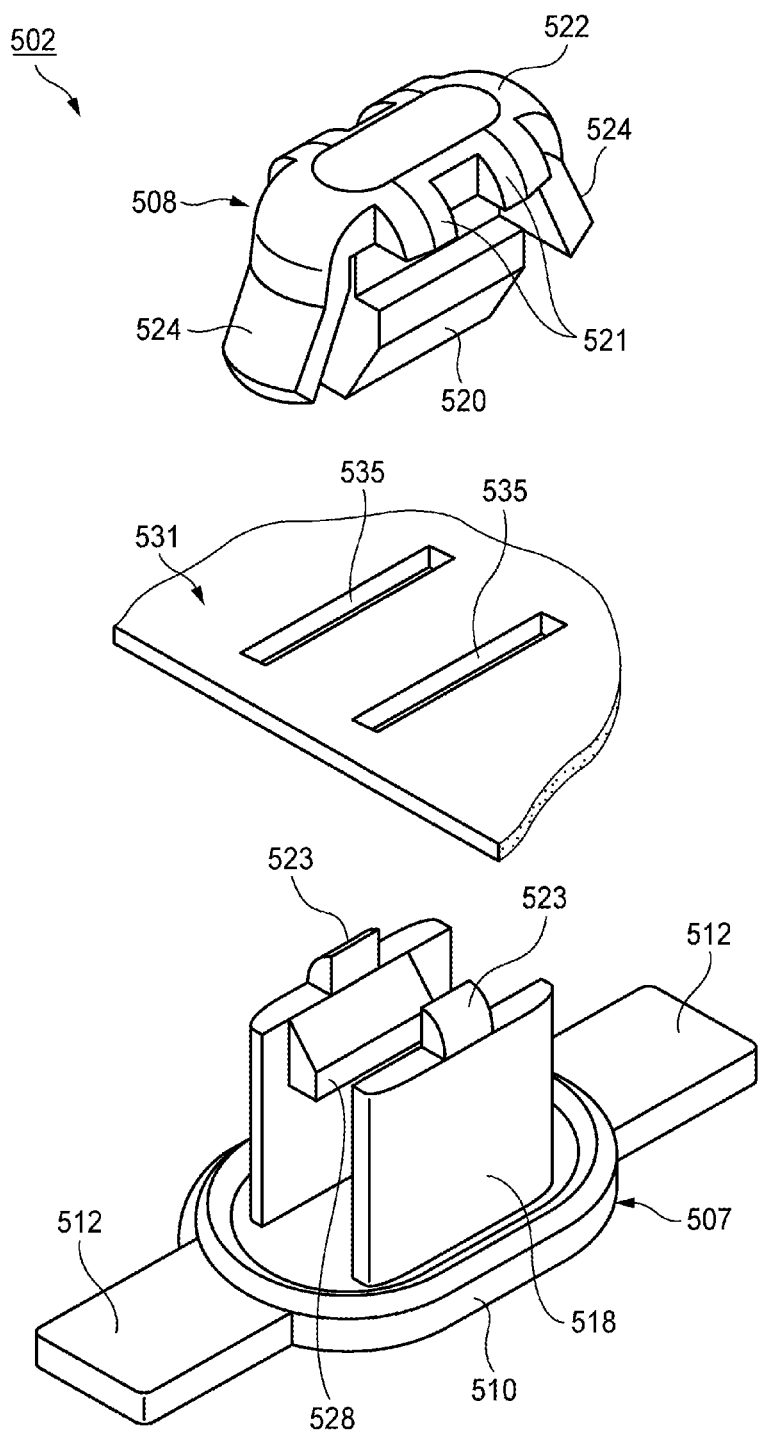
FIG. 6 is an exploded perspective view which indicates a traditional clip.

As shown in FIG. 5B, the wire harness 51 according to the present embodiment is constructed in which the one-sided self-adhesive sheet 31, whose special adhesive layer 33 is adhered to itself and bonded together, covers the base plate 21 of the clamp 15 and the electric wire 11, and the pair of locking claws 25 and the pressing portion 29 in the clamp 15 project from the attaching hole 39.

Therefore, according to the wire harness 51 of the present embodiment, since the above described clamp 15 is provided, the holding force of the one-sided self-adhesive sheet 31 and the clamp 15 can be improved without using a wire harness tape or the like.

Therefore, according to the clamp 15 and the wire harness 51 including the clamp 15 of the present embodiment described above, the clamp 15 which can be easily attached to the one-sided self-adhesive sheet 31 that holds the wire harness 51 and the wire harness 51 including the clamp 15 can be provided without increasing the number of components.

The features of the embodiment of clamp and the wire harness including the clamp according to the present invention described above are briefly, collectively listed as follows, respectively.

[1] A clamp (15) includes:

a base plate (21) which is locked to an adhesive sheet (one-sided self-adhesive sheet 31) which covers and holds an electric wire (11), a shaft (23) which projects from the base plate (21) and is inserted through an attaching hole (39) which is bored through the adhesive sheet (one-sided self-adhesive sheet 31), an engaging portion (locking claws 25) which is formed at the distal end of the shaft (23), is inserted through the attaching hole (39) and is engaged with an engaging hole (19) of an attached body (13), and fixing pieces (20) which project from the base plate (21) to have an interval (L1) between projecting ends of the fixing pieces (20) which is larger than the maximum opening width (L2) of the attaching hole (39), and hold and fix the fringe of the attaching hole with the base plate.

[2] The clamp (15) according to the above [1], wherein the shaft (23) has a pressing portion (29), which holds the fringe of the engaging hole (19) with the engaging portion (locking claws 25) to engage with the fringe from the back side of the insertion direction.

[3] The clamp (15) according to the above [1] or [2], wherein the projecting ends of the fixing pieces (20) are formed into a substantially arc shape.

[4] A wire harness (51) including an electric wire (11), an adhesive sheet (one-sided self-adhesive sheet 31) which covers and holds the electric wire (11), a clamp (15) whose base plate (21) is locked to the adhesive sheet (one-sided self-adhesive sheet 31), wherein the clamp (15) is a clamp (15) according to any one of the above [1] to [3].

The clamp and the wire harness including the clamp according to the present invention are not restricted to the above-described embodiment, and suitable modifications, improvements and the like can be made. Moreover, the materials, shapes, dimensions, numbers, installing places, and the like of the components in the above embodiment are arbitrarily set as far as the invention can be attained, and not particularly restricted.

What is claimed is:

1. A clamp comprising:
   a base plate that is locked to a sheet which covers and holds an electric wire,
   a shaft that projects from the base plate and is inserted through an attaching hole which is bored through the adhesive sheet,
   an engaging portion that is formed at the distal end of the shaft, is inserted through the attaching hole and is engaged with an engaging hole of an attached body, and
   fixing pieces that project directly from the base plate to have an interval between projecting ends of the fixing pieces which is larger than the maximum opening width of the attaching hole, and inserted through the attaching hole of the adhesive sheet to hold and fix the fringe of the attaching hole with the base plate such that the fringe of the attaching hole is sandwiched between the fixing pieces and the base plate, wherein the shaft projects from the base plate at a first location and the fixing pieces project from the base plate at a second location different from the first location, wherein the shaft has a pressing portion, which holds the fringe of the engaging hole with the engaging portion to engage with the fringe of the engaging hole the back side of the insertion direction such that the fringe of the engaging hole is sandwiched between the engaging portion and the pressing portion, and wherein the fixing pieces and the pressing portion extend toward respective longitudinal ends of the base plate.

2. The clamp according to claim 1, wherein the projecting ends of the fixing pieces are formed into a substantially arc shape.

3. A wire harness comprising an electric wire, an adhesive sheet which covers and holds the electric wire, a clamp whose base plate is locked to the adhesive sheet, wherein the clamp is a clamp according to of claim 1.

* * * * *